United States Patent [19]
Funakubo

[11] Patent Number: 6,067,089
[45] Date of Patent: *May 23, 2000

[54] TEXTURE MAPPING DEVICE

[75] Inventor: Noriyuki Funakubo, Hamamatsu, Japan

[73] Assignee: Yamaha Corporation, Hamamatsu, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/890,590

[22] Filed: Jul. 9, 1997

[30] Foreign Application Priority Data

Jul. 11, 1996 [JP] Japan .................................. 8-182364

[51] Int. Cl.$^7$ .................................................. G06T 15/00
[52] U.S. Cl. ........................... 345/430; 345/429; 345/425
[58] Field of Search .................................... 345/418, 419, 345/425, 426, 427, 428, 429, 430, 431, 432

[56] References Cited

U.S. PATENT DOCUMENTS

| | | | |
|---|---|---|---|
| 5,694,533 | 12/1997 | Richards et al. | 345/425 |
| 5,706,418 | 1/1998 | Uchiyama et al. | 345/425 |
| 5,748,867 | 5/1998 | Cosman et al. | 345/429 |
| 5,757,374 | 5/1998 | Nakamura et al. | 345/425 |
| 5,764,237 | 6/1998 | Kaneko | 345/430 |
| 5,796,407 | 8/1998 | Rebiai et al. | 345/430 |
| 5,805,782 | 9/1998 | Foran | 345/430 |
| 5,808,623 | 9/1998 | Hamburg | 345/425 |

FOREIGN PATENT DOCUMENTS

| | | |
|---|---|---|
| 3191485 | 8/1991 | Japan . |
| 7272000 | 10/1995 | Japan . |
| 8110951 | 4/1996 | Japan . |
| 8110952 | 4/1996 | Japan . |

*Primary Examiner*—Phu K. Nguyen
*Assistant Examiner*—Cliff N. Vo
*Attorney, Agent, or Firm*—Pillsbury Madison & Sutro LLP

[57] ABSTRACT

A texture mapping device is employed in a computer graphics system that visually displays an object in a three-dimensional manner. Herein, textures representing graphics patterns are put onto interior areas of the polygons which form a surface of the object displayed on a screen of a display device. A projective image is created by projecting a polygon (e.g., triangle) originally placed in a three-dimensional space onto a screen coordinates system. A texture memory stores texture data representing an image of texture with regard to a texture coordinates system. Screen addresses of the screen coordinates system as well as texture addresses of the texture coordinates system are calculated with respect to at least a start point and an end point corresponding to points of intersection formed between a horizontal scanning line of the screen and one side of the polygon. The device rounds off the screen addresses to produce integer screen addresses corresponding to locations of pixels which are placed in proximity to the points of intersection on the screen coordinates system. The texture addresses are corrected on the basis of differences between the screen addresses and integer screen addresses. The device rounds off the corrected texture addresses to produce integer texture addresses. Using the integer texture addresses, the texture data are read from the texture memory. Then, the texture data are written into the display memory at locations defined by the integer screen addresses. Thus, it is possible to perform texture mapping accurately with respect to pixels on the screen without positional deviations.

12 Claims, 5 Drawing Sheets

TEXTURE MAPPING DEVICE

BACKGROUND OF THE INVENTION

1. Field of the Invention

This invention relates to texture mapping devices which are employed in computer graphics systems that visually display objects in a three-dimensional manner as collections (or aggregation) of polygons. Herein, the texture mapping device is designed to perform texture mapping so that textures representing graphics patterns (such as grain patterns of woods) are put onto interior areas of the polygons which form a surface of the object displayed on a screen of a display device.

2. Prior Art

In computer graphics, an important problem is how to obtain images (or pictures) having a reality. To solve the problem, it is necessary to provide a technology of displaying an object in a three-dimentional manner. According to this technology, the object should be displayed in such a way that the people feel as if the object realy exists in a three-dimensional space. In addition, a surface of the object should be displayed with a reality. In general, a surface of an actual object which actually exists in the world of nature has colors and brightness. In addition, the actual object has patterns and a material feel that the surface thereof is felt rough or smooth. Further, a person feels in the sense of sight that the surface of the actual object may be changed in visual states in response to conditions such as positions and attitude. Such a change in the visual states of the surface of the object may construct a reality that the actual object possesses. In short, the reality of the displayed object depends on the display technique how to display the surface of the object with a reality.

The texture mapping technology is introduced to obtain displayed images that are capable of showing the visual states of the three-dimensional objects with a reality. Simply speaking, the texture mapping technology performs image processing that image patterns (or graphics patterns) called textures are put onto polygons which form the surface of the object which is displayed in a three-dimentional manner on a screen of a display device.

Next, a summary of the texture mapping technology will be simply described below.

Figure 4:
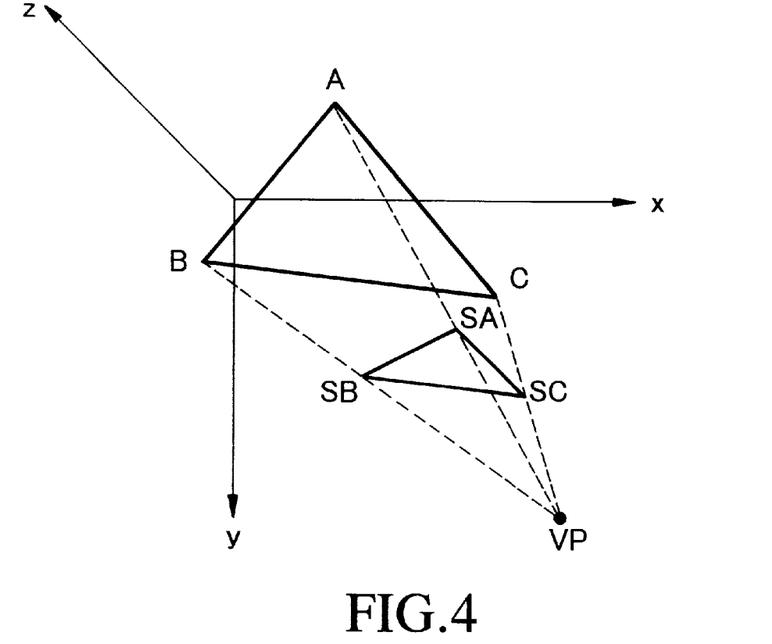
FIG. 4 shows a three-dimensional coordinates system in which triangles are drawn as an example of a polygon which is used in the three-dimensional computer graphics system.

FIG. 4 shows that a triangle ABC representing an example of the polygon is placed in a three-dimensional space constructed by 3 axes x, y and z. This triangle ABC shows an example of a polygon which forms a surface of a display object. In FIG. 4, VP designates a viewpoint. When taking a view from the viewpoint VP in a direction of the axis z, it is possible to obtain a projective image on a x-y plane defined by the axes x and y in response to the polygon. The projective image is displayed on a screen of the display device. In FIG. 4, a triangle consisting of three vertices SA, SB and SC corresponds to the projective image which is projected onto the x-y plane in response to the triangle ABC. That is, the triangle SA-SB-SC is a projective image of the triangle ABC which should be displayed on the screen of the display device, wherein the vertices SA, SB, SC respectively correspond to A, B, C of the triangle. In order to perform texture mapping on the surface of the display object, an image of the texture should be subjected to texture mapping into an interior area of the triangle SA-SB-SC within the screen of the display device.

Figure 5A:
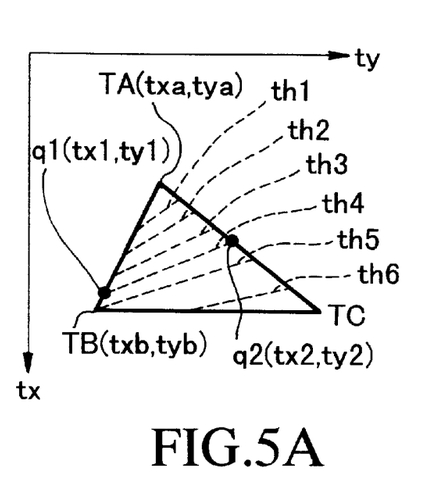
FIG. 5A shows an image of a triangle projected on a texture coordinates system.

To perform the texture mapping described above, texture data representing images of textures are stored in a memory, called a texture memory, in advance. FIG. 5A shows a two-dimensional coordinates system (hereinafter, referred to as a texture coordinates system) defined by coordinate axes tx and ty, wherein a triangle consisting of vertices TA, TB and TC is shown. This triangle TA-TB-TC is a right front view representing a part of the surface of the display object. The aforementioned texture data define colors and brightness (or luminance) with respect to segments of the image of the texture within the texture coordinates system. In order to obtain texture data with respect to a desired segment of the texture, it is necessary to access the texture memory in response to a read address. So, texture data of the desired segment of the texture are read from the texture memory. Herein, the read address is made by coordinates which are read from the texture coordinates system with regard to the desired segment. Incidentally, the coordinates will be referred to as a texture address (i.e., the aforementioned read address).

The display device displays images on the screen thereof on the basis of image data stored in a display memory. To put the texture onto an interior area of the triangle SA-SB-SC within the screen of the display device, texture data corresponding to the texture should be written into the display memory as image data which represent images placed inside of the triangle SA-SB-SC. To achieve the above, following operations are performed.

Figure 5B:
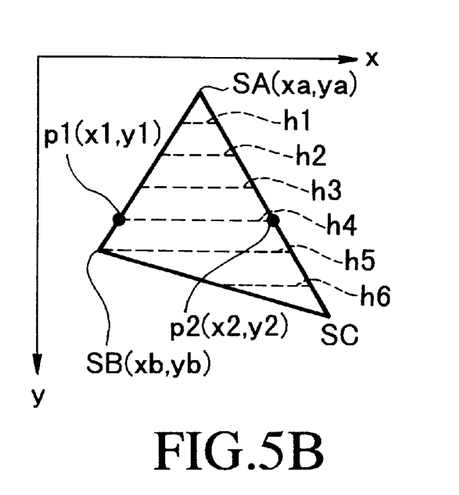
FIG. 5B shows an image of a triangle projected on a screen coordinates system.

FIG. 5B shows a x-y coordinates system (referred to as a screen coordinates system) wherein a triangle consisting of vertices SA, SB, SC is shown. The vertices SA, SB, SC shown in FIG. 5B respectively correspond to the vertices TA, TB, TC shown in FIG. 5A. So, texture data corresponding to the vertices TA, TB, TC are read from the texture memory and are then written at addresses of the display memory which correspond to the vertices SA, SB, SC. Thus, it is possible to perform texture mapping in an apparent manner with respect to the vertices SA, SB, SC only by use of the texture data of the vertices TA, TB, TC.

However, it may be uncertain to define relationships between points of the screen other than the vertices SA, SB, SC and points of the texture coordinates system of FIG. 5A. In other words, it is uncertain to define addresses by which texture data are read from the texture memory in accordance with the points of the screen. To solve such uncertainty, the system of the conventional technology employs a mapping method using interpolation calculations. Herein, steps of the mapping method are mainly classified into three processes (a), (b) and (c), as follows:

(a) The screen of the display device is constructed by a number of horizontal scanning lines. Herein, a certain set of horizontal scanning lines which traverse the triangle consisting of the vertices SA, SB, SC are selected from among the horizontal scanning lines constructing the screen of the display device. Points of intersection are formed between sides of the triangle and the horizontal scanning lines traversing the triangle. So, the system detects x-y coordinates from the screen coordinates system with respect to each point of intersection. Incidentally, the x-y coordinates will be referred to as a screen address. FIG. 5B shows line segments h1 to h6 which are parts of the horizontal scanning lines placed inside of the triangle SA-SB-SC on the screen. Points of intersection emerge at intersections formed between ends of the line segment and sides of the triangle. So, addresses are detected with respect to those points of intersection. For convenience' sake, a point of intersection which is formed between a left end of the line segment and a side of the triangle is called a start point, whilst a point of intersection which is formed between a right end of the line segment and a side of the triangle is called an end point.

(b) Next, the system performs interpolation calculations to calculate a texture address with respect to each of points of the texture coordinates system (see FIG. 5A) which respectively correspond to the start point and end point of each line segment. Line segments th1 to th6 shown in FIG. 5A are equivalent to the aforementioned line segments h1 to h6 of FIG. 5B which are projected onto the texture coordinates system. So, the system calculates a texture address representing a point of intersection which is formed between each of the line segments th1 to th6 and each side of the triangle consisting of vertices TA, TB, TC.

In FIG. 5B, for example, a start point p of the line segment h4 has a screen address (x1, y1); the vertex SA has a screen address (xa, ya); and the vertex SB has a screen address (xb, yb). In FIG. 5A, the vertex TA has a texture address (txa, tya); and the vertex TB has a texture address (txb, tyb). The start point p1 of the screen coordinates system of FIG. 5B corresponds to a point q1 of the texture coordinates system of FIG. 5A. Herein, the point q1 has a texture address (ty1, ty1) which is calculated by interpolation calculations, as follows:

$$tx1 = txb + \{(x1-xb)/(xa-xb)\} \cdot (txa-txb) \quad (1)$$

$$ty1 = tyb + \{(y1-yb)/(ya-yb)\} \cdot (tya-tyb) \quad (2)$$

Similar calculations are performed with respect to the start points and end points of the line segments th1 to th6. That is, interpolation calculations are performed using screen addresses of start points and end points of the line segments h1 to h6 and screen addresses of the vertices SA, SB, SC on the screen coordinates system as well as texture addresses of the vertices TA, TB, TC on the texture coordinates system. Thus, it is possible to calculate texture addresses with respect to each of the start points and end points.

(c) On the basis of the texture addresses which are produced by the aforementioned process (b), texture data representing images of the line segments th1 to th6 are read from the texture memory. Then, the read texture data are written into the display memory as image data used for displaying the line segments h1 to h6 on the screen coordinates system.

As a result, texture data representing the interior area of the triangle TA-TB-TC of the texture coordinates system are written into the display memory as image data representing the interior area of the triangle SA-SB-SC.

The aforementioned processes are performed with respect to each portion of the display object which is displayed on the screen of the display device. Thus, it is possible to obtain a three-dimensional image, having a reality, whose surface is decorated with textures.

In the conventional technology described heretofore, texture data representing the line segments th1 to th6 of the texture coordinates system should be displayed to accurately match with locations of the line segments h1 to h6 on the screen coordinates system. In general, however, a finite number of pixels are arranged with equal pitches on the screen of the display device. So, the texture data of the line segments th1 to th6 should be displayed using those pixels. For this reason, when the texture data of the line segments th1 to th6 are written into the display memory, a rounding process such as a round-off process is effected on the screen addresses. Due to the rounding process, values of the screen addresses are converted to integers. Those integers of the screen addresses are used as write addresses for the display memory. Due to rounding errors of the rounding process, actual display locations of the line segments th1 to th6 of the texture coordinates system deviate from desired display locations at which the line segments should be displayed on the screen. In other words, a positional gap occurs between the actual display location and desired display location. If such a positional gap occurs in the texture mapping, notches may emerge particularly on straight-line portions of the images displayed on the screen of the display device. This is a problem that clear and fine images cannot be obtained.

Figure 6A:
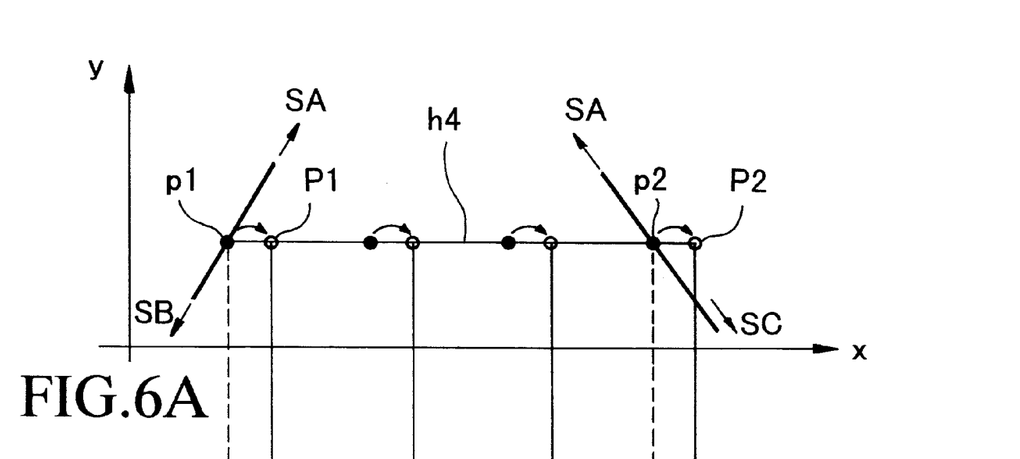
FIG. 6A shows an enlarged image of a line segment which is shown in FIG. 5B.

Next, an in-depth description will be given with respect to the above problem by using an concrete example. FIG. 6A shows an enlarged image of the line segment h4 shown in FIG. 5B, wherein circles (○) disposed on the line segment h4 indicate locations of pixels. Herein, x-coordinate values of addresses representing a start point p1 and an end point p2 of the line segment h4 are calculated by the aforementioned interpolation calculations. Those x-coordinate values deviate from x-coordinate values of the pixels which are integers.

Figure 6B:
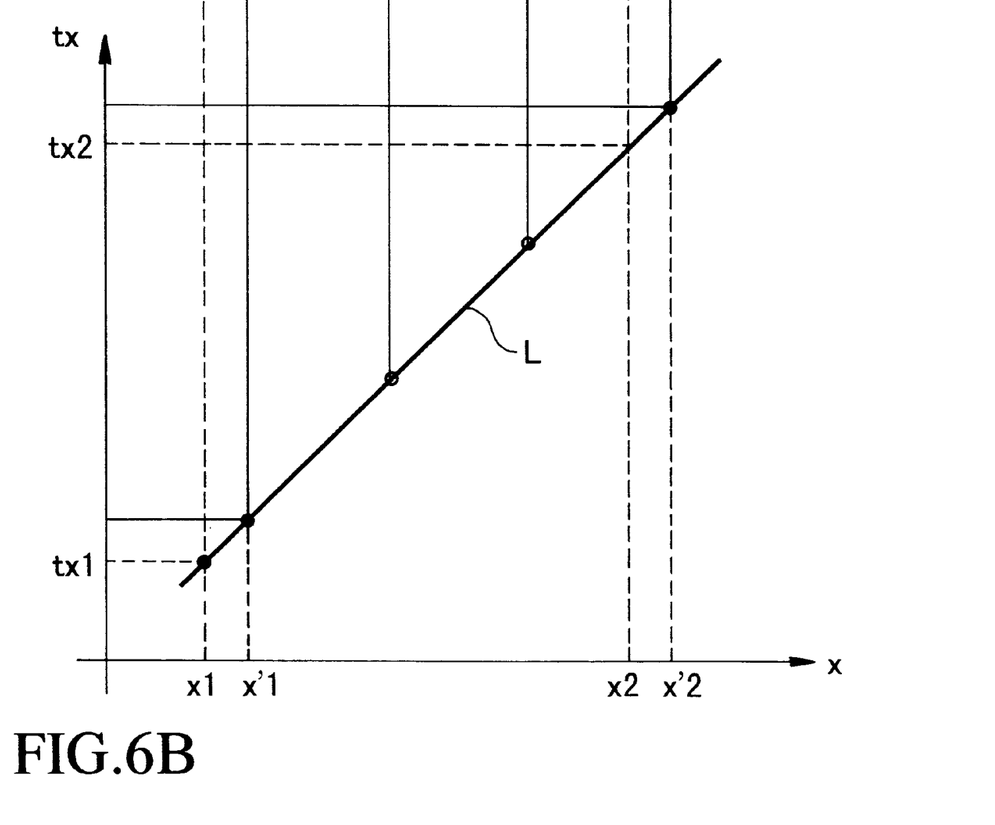
FIG. 6B shows a x-tx coordinates system in which a straight line is drawn to explain a method to calculate texture addresses with respect to the line segment shown in FIG. 6A.

Now, texture data should be obtained with respect to a certain portion of the line segment h4. In order to do so, it is necessary to calculate a texture address with respect to the certain portion of the line segment h4, as follows:

FIG. 6B shows a x-ty coordinates system in which a straight line L is drawn to pass through a point (x1, tx1) and a point (x2, tx2). Herein, tx-coordinate values tx1 and tx2 of the above points are x-coordinate values of points q1 and q2 of the texture coordinates system (see FIG. 5A) which respectively correspond to the start point p1 and end point p2. They are calculated by the aforementioned equations of the interpolation calculations. Using equations of the interpolation calculations regarding the straight line L, it is possible to calculate a tx-coordinate value for a texture address of a point of the line segment th4 which corresponds to a point of the line segment h4 arbitrarily selected. So, the calculations are started when a specific point of the line segment h4 is given. Herein, projection is made between the line segment h4 and the straight line L with respect to the specific point. Thus, it is possible to read a tx-coordinate value from the straight line L on the texture coordinates system in response to a x-coordinate value of the specific point. Using such a principle, it is possible to obtain a texture address with respect to a specific point which is selected from among points constructing the line segment h4. Incidentally, the above principle is explained using FIGS. 6A and 6B with respect to the method to obtain a tx-coordinate value of the texture address only. However, a ty-coordinate value of the texture address can be obtained as well in a similar way.

Using the above interpolation calculations, it is possible to obtain a texture address (tx, ty) with respect to a necessary point which is selected from among points constructing the line segment th4 on the texture coordinates system. Thus, texture data are sequentially read from the texture memory in accordance with the texture addresses which are sequentially calculated as described above. Then, the texture data are written into the display memory as image data which correspond to points constructing the line segment h4 on the x-y coordinates system.

The writing of the image data into the display memory is performed using "integer" addresses which correspond to integers representing screen addresses corresponding to points constructing the line segment h4. As a result, each texture data is assigned to a pixel which may deviate from a desired display location at which each texture data should be originally displayed. Such a deviation in displaying will be described below in conjunction with FIGS. 6A and 6B.

Originally, texture data corresponding to a texture address (tx1, ty1) should be written into the display memory as image data corresponding to the start point p1. However, the conventional technology uses only an integer of a screen address of the start point p1. So, the above texture data corresponding to the start point p1 is written into the display memory as image data corresponding to a pixel P1 which is located in proximity to the start point p1 (see FIG. 6A). Such a deviation occurs on the end point p2 as well. That is, texture data which should be assigned to the end point p2 is assigned to a pixel P2 which is located in proximity to the end point p2. Similarly, other texture data corresponding to other points of the line segment h4 which are located between the start point p1 and end point p2 are assigned to pixels deviating from desired display locations at which they should be originally displayed.

The conventional technology employs the rounding process to round up addresses when effecting the texture mapping, so texture data are subjected to mapping to wrong display locations which deviate from desired display positions by rounding errors. In short, the conventional technology suffers from a problem that positional deviations occur on display locations for displaying texture data on a screen of a display device due to the rounding of addresses.

SUMMARY OF THE INVENTION

It is an object of the invention to provide a texture mapping device in which texture data are subjected to texture mapping to desired display locations on a screen of a display device without causing positional deviations.

A texture mapping device of this invention is employed in a computer graphics system that displays an object in a three-dimensional manner as a collection of polygons (e.g., triangle). Herein, textures representing graphics patterns are put onto interior areas of the polygons which form a surface of the object. The object is displayed on a screen of a display device on the basis of image data stored in a display memory. A projective image is created with respect to the polygon on a screen coordinates system. A texture memory stores texture data representing images of the textures with regard to a texture coordinates system. Screen addresses of the screen coordinates system and texture addresses of the texture coordinates system are calculated with respect to at least a start point and an end point corresponding to points of intersection formed between a horizontal scanning line of the screen and one side of the polygon. The device rounds off the screen addresses to produce integer screen addresses corresponding to locations of pixels which are placed in proximity to the points of intersection on the screen coordinates system. The texture addresses are corrected on the basis of differences between the screen addresses and integer screen addresses. The device rounds off the corrected texture addresses to produce integer texture addresses. Using the integer texture addresses, the texture data are read from the texture memory. Then, the texture data are written into the display memory at locations defined by the integer screen addresses.

Incidentally, the device further performs an interpolation process on the screen addresses and texture addresses corresponding to the start point and end point so as to produce a number of integer screen addresses and a number of integer texture addresses with respect to pixels which are disposed on the horizontal scanning line and which define a range of the horizontal scanning line between the start point and end point.

Thus, it is possible to perform texture mapping accurately with respect to pixels on the screen without positional deviations.

BRIEF DESCRIPTION OF THE DRAWINGS

These and other objects of the subject invention will become more fully apparent as the following description is read in light of the attached drawings wherein.

DESCRIPTION OF THE PREFERRED EMBODIMENT

Figure 1:
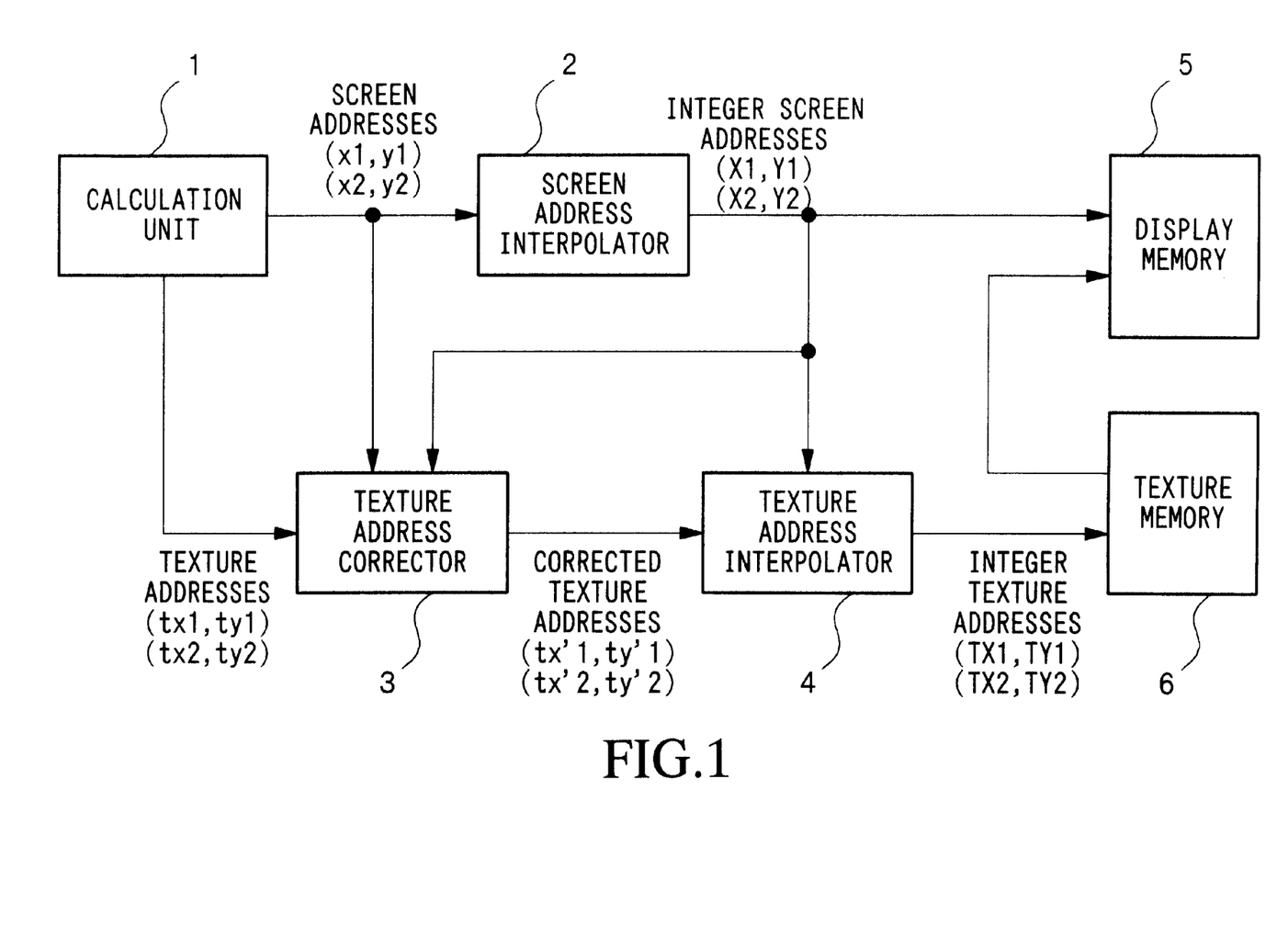
FIG. 1 is a block diagram showing a configuration of a texture mapping device which is designed in accordance with an embodiment of the invention.

FIG. 1 is a block diagram showing a configuration of a texture mapping device which is designed in accordance with an embodiment of the invention. Herein, a display memory 5 stores image data corresponding to pixels arranged on a screen of a display device (not shown), whilst a texture memory 6 stores texture data representing images of textures put onto polygons which form a surface of a display object which is displayed on the screen of the display device. Now, physically separate memories can be independently provided for the display memory 5 and texture memory 6. Or, a single memory can be provided to accomplish functions of the memories 5 and 6. Herein, the memory contains storage areas which are respectively used for the memories 5 and 6.

A calculation unit 1 performs calculations to produce addresses which are necessary for texture mapping. The calculations have two steps, as follows:

(a) At first, the calculation unit 1 performs calculations with respect to a triangle which is an example of a polygon forming a surface of a display object displayed on the screen of the display device. Based on screen addresses corresponding to vertices of the triangle, the calculation unit 1 calculates screen addresses with respect to points of intersection between sides of the triangle and horizontal scanning lines, i.e., with respect to the aforementioned start points and end points on the horizontal scanning lines (see FIG. 5B).

(b) Then, the calculation unit 1 calculates texture addresses with respect to points of the texture coordinates system (see FIG. 5A) which correspond to the points of intersection.

A screen address interpolator 2 performs an interpolation process and a rounding process on the screen addresses which are given from the calculation unit 1 with respect to the start points and end points. Thus, the screen address interpolator 2 sequentially produces interpolated screen addresses corresponding to pixels which are used to display a portion of the screen defined between the start point and end point of the texture. Herein, the interpolated screen addresses are "integer" screen addresses each represented by an integer. Those addresses are supplied to the display memory 5.

Figure 2:
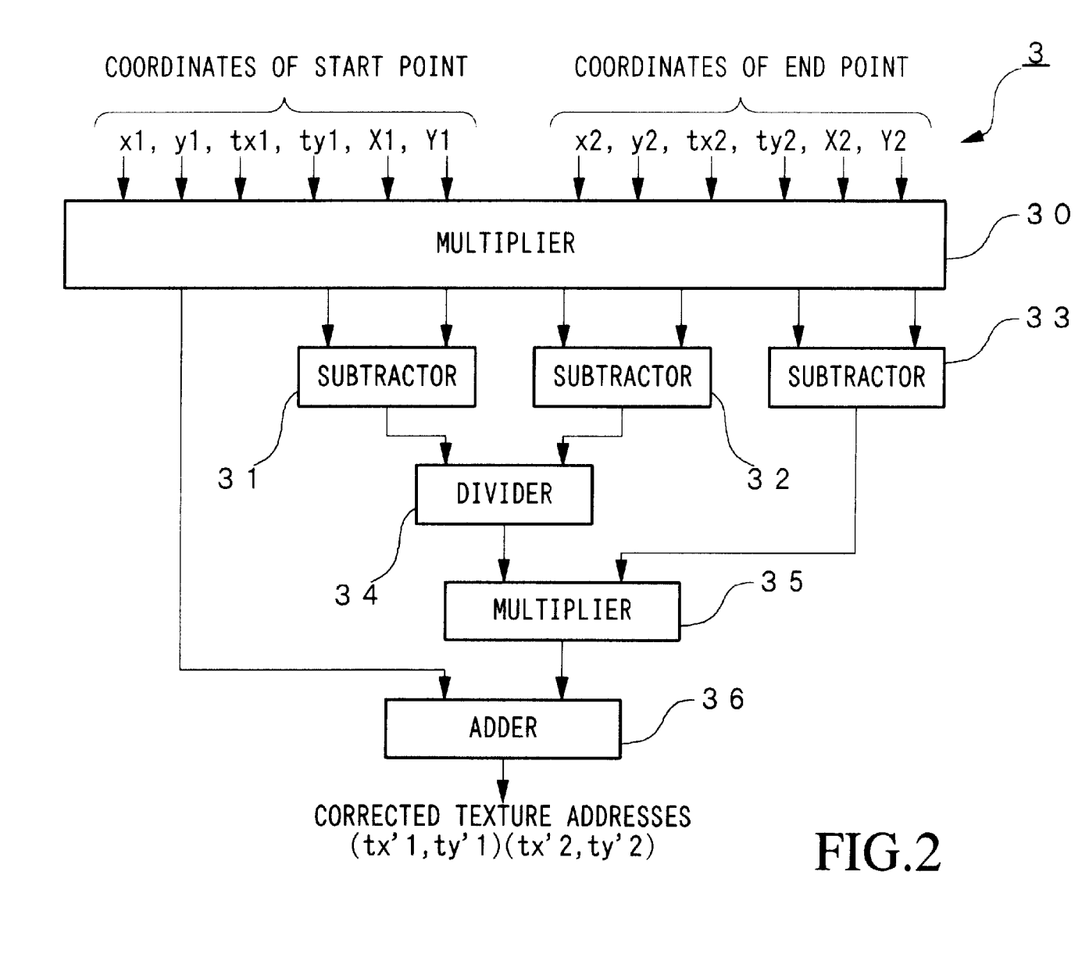
FIG. 2 is a block diagram showing an internal configuration of a texture address corrector shown in FIG. 1.

A texture address corrector 3 is a most characteristic element of the present embodiment. The texture address corrector 3 performs corrections on the texture addresses, which the calculation unit 1 produces with respect to the start point and end point, on the basis of the interpolated screen addresses which the screen address interpolator 2 produces with respect to pixels which are located in proximity to the start point and end point respectively. That is, the texture addresses of the start point and end point are corrected to match with the screen addresses of the pixels. FIG. 2 shows an example of an internal configuration of the texture address corrector 3. Herein, the texture address corrector 3 is configured by a multiplexer 30, subtractors 31 to 33, a divider 34, a multiplier 35 and an adder 36. The multiplexer 30 changes over inputs of the subtractors 31 to 33. In short, the texture address interpolator 3 performs correction calculations realizing the aforementioned corrections to produce corrected texture addresses of the start point and end point. The specifics of the correction calculations will be described later.

Next, a texture address interpolator 4 performs an interpolation process and a rounding process on the corrected texture addresses of the start point and end point. Thus, the texture address interpolator 4 produces interpolated texture addresses corresponding to pixels which are used to display a portion of the screen defined between the start point and end point. Herein, the interpolated texture addresses are "integer" texture addresses each represented by an integer. Those addresses are sequentially supplied to the texture memory 6.

Figure 3A:
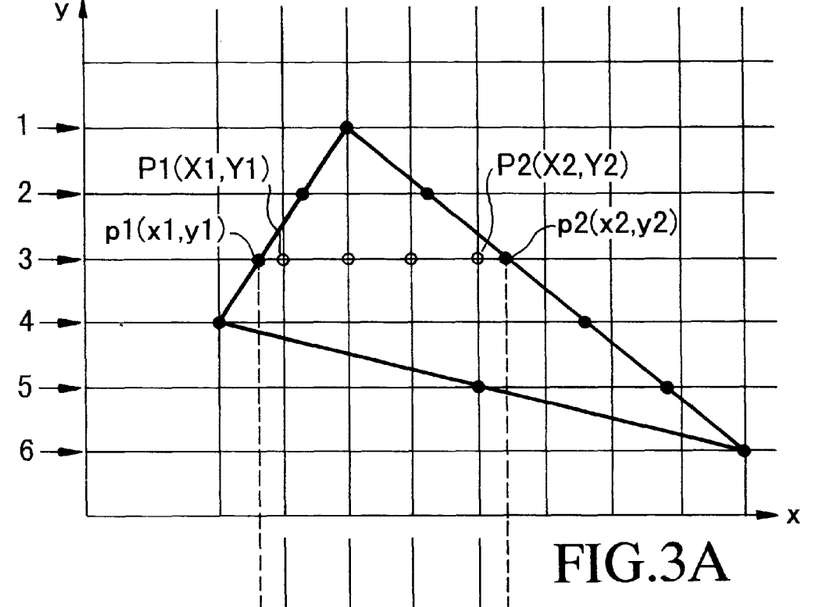
FIG. 3A is a graph showing an image of a triangle projected on a screen coordinates system.

Next, a description will be given with respect to operations of the present embodiment in conjunction with FIGS. 3A and 3B. FIG. 3A shows a screen coordinates system in which a triangle is drawn for texture mapping. Based on instructions given from a control unit such as a CPU (not shown), the calculation unit 1 performs calculations to create screen addresses with respect to points of intersection which are formed between sides of the triangle and horizontal scanning lines in FIG. 3A. That is, the calculation unit 1 creates screen addresses indicated by black marks (●) shown in FIG. 3A.

Then, the calculation unit 1 transfers the screen addresses of the points of intersection to the screen address interpolator 2 with respect to each of the horizontal scanning lines. That is, the calculation unit 1 transfers two screen addresses with respect to each horizontal scanning line. Herein, a leftmost screen address corresponds to a start point, whilst a rightmost screen address corresponds to an end point. As for a horizontal scanning line 3, for example, the calculation unit 1 transfers a screen address (x1, y1) of a start point p1 and a screen address (x2, y2) of an end point to the screen address interpolator 2. In addition, the calculation unit 1 calculates a texture address (tx1, ty1) corresponding to the start point p1 as well as a texture address (tx2, ty2) corresponding to the end point p2. Those texture addresses are transferred to the texture address interpolator 3.

The screen address interpolator 2 effects a rounding process (e.g., round-off process) on the screen address (x1, y1) of the start point p1 and the screen address (x2, y2) of the end point p2. Thus, the screen address interpolator 2 produces integer screen addresses (X1, Y1) and (X2, Y2). Then, the screen address interpolator 2 performs an interpolation process to produce all integer screen addresses which are placed to correspond to pixels on a horizontal scanning line of the start point p1 and end point p2 and which are defined between the integer screen addresses (X1, Y1) and (X2, Y2). For example, four pixels indicated by circle marks (○) are disposed on the horizontal scanning line 3 between the start point p1 (x1, y1) and end point p2 (x2, y2). Thanks to the aforementioned interpolation process, the screen address interpolator 2 produces four screen addresses, such as P1 (X1, Y1) and P2 (X2, Y2), corresponding to the four pixels respectively. Those screen addresses of the pixels are supplied to the display memory 5 as write addresses which designate write locations to write texture data.

As described before, the screen addresses (X1, Y1) and (X2, Y2) correspond to pixels P1 and P2 which are located in proximity to the start point p1 (x1, y1) and the end point p2 (x2, y2) respectively, wherein those screen addresses are supplied to the display memory 5. On the other hand, the texture addresses (tx1, ty1) and (tx2, ty2) produced by the calculation unit 1 directly correspond to the start point p1 (x1, y1) and the end point p2 (x2, y2). So, when a texture belonging to a range of texture addresses defined between the texture addresses (tx1, ty1) and (tx2, ty2) are subjected to texture mapping to a range of screen addresses defined between the screen addresses (X1, Y1) and (X2, Y2), the texture mapping is accomplished with positional deviations which correspond to rounding errors. The present embodiment is designed to prevent such positional deviations from occurring due to the rounding errors. That is, the texture addresses are corrected so that the positional deviations of the texture do not occur due to the rounding errors; and consequently, the texture addresses are forced to match with integer addresses which are supplied to the display memory 5. The above corrections are made by the texture address corrector 3.

Figure 3B:
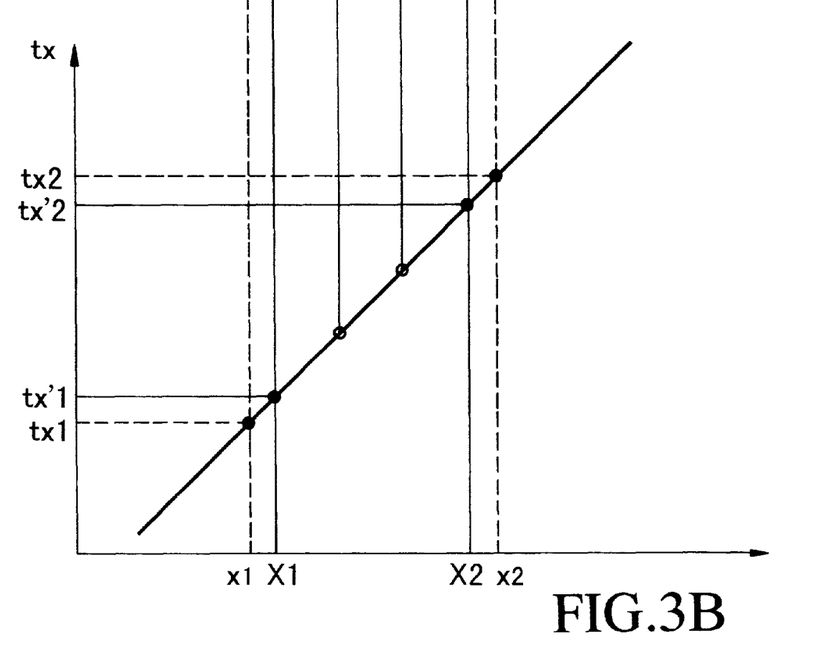
FIG. 3B is a graph showing x-tx coordinates system in which a straight line is drawn to explain a method to calculate texture addresses with respect to pixels on a horizontal scanning line shown in FIG. 3A.

FIG. 3B shows x-tx coordinates system which is defined by x-coordinate values of the screen coordinates system and ty-coordinate values of the texture coordinates system. Herein, a straight line drawn in FIG. 3B shows a relationship between the x-coordinate values and tx-coordinate values which correspond to points constructing the horizontal scanning line 3 defined by the start point p1 and end point p2. This straight line of the x-tx coordinates system of FIG. 3B passes through two points having addresses (x1, tx1) and (x2, tx2). So, a gradient of the straight line is calculated by a mathematical expression of $(tx2-tx1)/(x2-x1)$.

By the way, x-coordinate values X1 and X2 of the integer screen addresses representing the pixels P1 and P2 are produced by the screen address interpolator 2 in response to x-coordinate values x1 and x2 of the screen addresses representing the start point p1 and end point p2. Those values X1 and X2 are supplied to the display memory 5. Herein, X1 deviates from x1, which corresponds to tx1 of the texture address, by a rounding error of (X1−x1), whilst X2 deviates from x2, which corresponds to tx2 of the texture address, by a rounding error of (X2−x2). Due to the rounding errors, deviations occur on tx-coordinate values of the texture addresses. That is, a deviation which occurs on tx1 is expressed as follows:

$$\{(tx2-tx1)/(x2-x1)\} \cdot (X1-x1)$$

A deviation which occurs on tx2 is expressed as follows:

$$\{(tx2-tx1)/(x2-x1)\} \cdot (X2-x2)$$

In the present embodiment, the texture address corrector 3 calculates tx-coordinate values tx'1 and tx'2, which accurately correspond to X1 and X2 of the integer screen addresses representing the pixels P1 and P2, in accordance with equations as follows:

$$tx'1=tx1+\{(tx2-tx1)/(x2-x1)\} \cdot (X1-x1) \quad (3)$$

$$tx'2=tx2+\{(tx2-tx1)/(x2-x1)\} \cdot (X2-x2) \quad (4)$$

Similar calculations are performed with respect to ty1 and ty2 of the texture addresses. That is, the texture address corrector 3 calculates ty-coordinates values ty'1 and ty'2, which accurately correspond to Y1 and Y2 of the integer screen addresses representing the pixels P1 and P2, in accordance with equations as follows:

$$ty'1=ty1+\{(ty2-ty1)/(x2-x1)\} \cdot (X1-x1) \quad (5)$$

$$ty'2=ty2+\{(ty2-ty1)/(x2-x1)\} \cdot (X2-x2) \quad (6)$$

In accordance with the above equations, the texture addresses (tx1, ty1) and (tx2, ty2) are corrected to accurately correspond to the integer screen addresses (X1, Y1) and (X2, Y2). Thus, it is possible to obtain corrected texture addresses (tx'1, ty'1) and (tx'2, ty'2), which are transferred to the texture address interpolator 4.

The texture address interpolator 4 effects an interpolation process and a rounding process on the corrected texture addresses (tx'1, ty'1) and (tx'2, ty'2). Thus, the texture address interpolator 4 sequentially produces integer texture addresses (TX, TY) corresponding to pixels which are used to display a texture belonging to a range defined between the start point p1 (x1, y1) and the end point p2 (x2, y2). In FIG. 3A, for example, the texture address corrector 3 produces the texture addresses (tx'1, ty'1) and (tx'2, ty'2) representing only two pixels P1 and P2 within four pixels which are used to display a range defined between the start point p1 (x1, y1) and the end point p2 (x2, y2) on the horizontal scanning line 3. However, the texture address corrector 3 does not produce texture addresses representing other two pixels which are disposed between the pixels P1 and P2 on the horizontal scanning line 3. So, the texture address interpolator 4 calculates tx-coordinate values of the texture addresses representing the other two pixels. That is, the texture address interpolator 4 divides an interval of distance defined between tx'1 and tx'2 by '3' so as to locate tx coordinates of the other two pixels. Similar calculations are made to produce ty-coordinate values of the texture addresses representing the other two pixels. Thus, it is possible to obtain four texture addresses (tx, ty) corresponding to the four pixels. The above texture addresses are real-number addresses each represented by a real number. For this reason, a rounding process is effected on the texture addresses to produce integer texture addresses, e.g., (TX1, TY1) and (TX2, TY2).

The texture addresses (TX1, TY1) to (TX2, TY2) corresponding to the four pixels are sequentially supplied to the texture memory 6. Using the texture addresses, texture data corresponding to the pixels are sequentially read from the texture memory 6 and are supplied to the display memory 5. On the other hand, the display memory 5 is supplied with the screen addresses (X1, Y1) to (X2, Y2) corresponding to the four pixels. As a result, the texture data corresponding to the texture addresses (TX1, TY1) to (TX2, TY2) are written into the display memory 5 at the screen addresses corresponding to the four pixels.

Thus, the texture mapping is performed on the display memory 5 at locations which accurately correspond to the pixels constructing a range of the horizontal scanning line 3 defined between the start point p1 and end point p2. Similar manner of processing is performed with respect to the other horizontal scanning lines as well.

As described above, the present embodiment teaches an application of this invention to the texture mapping device of a certain type which uses the linear interpolation in a horizontal scanning direction and a vertical scanning direction so as to calculate texture addresses of the texture coordinates system with respect to an outline (or profile) of the texture which is projected onto the screen coordinates system. However, this invention is not limited to the present embodiment described above. In other words, it is possible to arbitrarily change a configuration and operation of the embodiment to cope with the projection method of textures as well as the contents of the interpolation calculations to calculate texture addresses. This invention is fundamentally designed to project a polygon (e.g., triangle) of the three-dimensional space onto the two-dimensional screen coordinates system. In addition, this invention is characterized to perform positional corrections on the textures by rounding errors of the rounding process which rounds off screen addresses corresponding to the polygons to match with integer screen addresses corresponding to pixels on the screen coordinates system. The positional corrections can be changed in a variety of ways to match with the projection method of polygons as well as the contents of the interpolation calculations.

Applicability of this invention can be extended in a variety of ways. Functions of the texture mapping device are not necessarily actualized by the hardware system. That is, the functions can be achieved by the software system. In addition, programs and data actualizing the functions of the texture mapping device can be stored in storage media (or computer-readable media) such as floppy disks, CD-ROMs, magneto-optics disks, hard-disk units, etc.

The computer graphics system incorporating the texture mapping device can be linked with a server computer via a communication network such as a local area network (LAN) and a computer network such as "internet" as well as telephone lines. So, the programs and data can be downloaded to the system from the server computer via the communication network on demand.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A texture mapping device employed in a computer graphics system that visually displays an object in a three-dimensional manner as a collection of polygons, wherein textures representing graphics patterns are put onto interior areas of the polygons which form a surface of the object displayed on a screen of a display device, the texture mapping device comprising:

texture storing means for storing texture data representing an image of texture on a two-dimensional texture coordinates system;

projection means for projecting a polygon placed in a three-dimensional space onto a two-dimensional screen coordinates system which corresponds to the screen of the display device;

calculation means for performing interpolation calculations to produce texture addresses with respect to an outline of the polygon which is projected on the screen coordinates system;

rounding means for effecting a rounding process on screen addresses corresponding to the outline of the polygon projected on the screen coordinates system so as to calculate screen addresses of pixels to display the texture on the screen of the display device;

correcting means for correcting the texture addresses corresponding to the outline of the polygon on the basis of a rounding error of the rounding process, thus producing corrected texture addresses; and read means for using the corrected texture addresses to read texture data, corresponding to pixels of the screen, from the texture storing means. an area defined by the screen addresses of the pixels.

2. A texture mapping device employed in a computer graphics system that visually displays an object in a three-dimensional manner as a collection of polygons, wherein textures representing graphics patterns are put onto interior areas of the polygons which form a surface of the object displayed on a screen of a display device, the texture mapping device comprising:

texture data storing means for storing texture data representing an image of texture on a two-dimensional texture coordinates system;

calculation means for calculating screen addresses with respect to vertices of a polygon which is obtained by projecting a polygon placed in a three-dimensional space onto a two-dimensional screen coordinates system, so that the calculation means calculates screen addresses representing points of intersection between sides of the polygon and horizontal scanning lines of the screen on the basis of the screen addresses of the vertices of the polygon, the calculation means also calculating texture addresses with respect to the points of intersection on the basis of the screen addresses of the vertices of the polygon and the screen addresses of the points of intersection as well as texture addresses which specify locations of the vertices of the polygon on the texture coordinates system;

screen address interpolation means for effecting an interpolation process and a rounding process on screen addresses representing two points of intersection disposed on a horizontal scanning line within the horizontal scanning lines each having the points of intersection, thus producing screen addresses with respect to two pixels which are located in proximity to the two points of intersection on the horizontal scanning line and which are used to display a range of the horizontal scanning line defined between the two points of intersection, wherein the screen addresses of the two pixels are supplied to a display memory;

texture address correction means for correcting the texture addresses of the points of intersection on the basis of differences between the screen addresses of the points of intersection and the screen addresses of the two pixels which are produced by the screen address interpolation means, thus producing corrected texture addresses which correspond to the two pixels;

texture address interpolation means for effecting an interpolation process on the corrected texture addresses which are produced by the texture address correction means, thus producing texture addresses corresponding to other pixels which are disposed on the horizontal scanning line between the two pixels; and read means for reading texture data from the texture storing means in accordance with the texture addresses of the pixels disposed on the horizontal scanning line between the points of intersection.

3. A texture mapping device employed in a computer graphics system that visually displays an object in a three-dimensional manner as a collection of polygons, wherein textures representing graphics patterns are put onto interior areas of the polygons which form a surface of the object displayed on a screen of a display device, the texture mapping device comprising:

image creating means for projecting a polygon placed in a three-dimensional space onto a screen coordinates system which is two dimensional so as to create a projective image of the polygon on the screen coordinates system, the image creating means also creating an image of the polygon with regard to a texture coordinates system which is two dimensional;

texture storing means for storing texture data representing an image of texture on the texture coordinates system;

calculation means for performing calculations to produce screen addresses of the screen coordinates system and texture addresses of the texture coordinates system with respect to at least a start point and an end point which correspond to points of intersection formed between a horizontal scanning line of the screen and one side of the polygon;

screen address adjusting means for adjusting the screen addresses to produce integer screen addresses representing locations of pixels which are placed in proximity to the points of intersection on the screen coordinates system;

texture address correcting means for correcting the texture addresses on the basis of differences between the screen addresses and the integer screen addresses, thus producing corrected texture addresses;

texture address adjusting means for adjusting the corrected texture addresses to produce integer texture addresses; and read means for reading the texture data from the texture storing means in accordance with the integer texture addresses.

4. A texture mapping device according to claim 3 wherein the texture has a polygon shape.

5. A texture mapping device according to claim 3 wherein the screen address adjusting means rounds off the screen addresses to produce the integer screen addresses, whilst the texture address adjusting means rounds of the texture addresses to produce the integer texture addresses.

6. A texture mapping device according to claim 3 wherein the screen address adjusting means performs an interpolation process and a rounding process on the screen addresses corresponding to the start point and end point so as to produce a number of integer screen addresses corresponding to pixels which are disposed on the horizontal scanning line and which define a range of the horizontal scanning line between the start point and end point, whilst the texture address adjusting means performs an interpolation process and a rounding process on the texture addresses corresponding to the start point and end point so as to produce a number of integer texture addresses corresponding to pixels which are disposed on the horizontal scanning line and which define a range of the horizontal scanning line between the start point and end point.

7. A texture mapping device according to claim 3 wherein the polygon is a triangle.

8. A texture mapping method actualized in a computer graphics system that visually displays an object in a three-dimensional manner as a collection of polygons, wherein textures representing graphics patterns are put onto interior areas of the polygons which form a surface of the object displayed on a screen of a display device, the texture mapping method comprising the steps of:

storing texture data representing an image of texture on a two-dimensional texture coordinates system;

projecting a polygon placed in a three-dimensional space onto a two-dimensional screen coordinates system which corresponds to the screen of the display device;

performing interpolation calculations to produce texture addresses with respect to an outline of the polygon which is projected on the screen coordinates system;

effecting a rounding process on screen addresses corresponding to the outline of the polygon projected on the screen coordinates system so as to calculate screen addresses of pixels to display the texture on the screen of the display device;

correcting the texture addresses corresponding to the outline of the polygon on the basis of a rounding error of the rounding process, thus producing corrected texture addresses; and using the corrected texture addresses to read texture data corresponding to pixels of the screen.

9. A texture mapping method actualized in a computer graphics system that visually displays an object in a three-dimensional manner as a collection of polygons, wherein textures representing graphics patterns are put onto interior areas of the polygons which form a surface of the object displayed on a screen of a display device, the texture mapping method comprising the steps of:

storing texture data representing an image of texture on a two-dimensional texture coordinates system;

calculating screen addresses with respect to vertices of a polygon which is obtained by projecting a polygon placed in a three-dimensional space onto a two-dimensional screen coordinates system, wherein the screen addresses represent points of intersection between sides of the polygon and horizontal scanning lines of the screen on the basis of the screen addresses of the vertices of the polygon;

calculating texture addresses with respect to the points of intersection on the basis of the screen addresses of the vertices of the polygon and the screen addresses of the points of intersection as well as texture addresses which specify locations of the vertices of the polygon on the texture coordinates system;

effecting an interpolation process and a rounding process on screen addresses representing two points of intersection disposed on a horizontal scanning line within the horizontal scanning lines each having the points of intersection, thus producing screen addresses with respect to two pixels which are located in proximity to the two points of intersection on the horizontal scanning line and which are used to display a range of the horizontal scanning line defined between the two points of intersection;

correcting the texture addresses of the points of intersection on the basis of differences between the screen addresses of the points of intersection and the screen addresses of the two pixels, thus producing corrected texture addresses which correspond to the two pixels;

effecting an interpolation process on the corrected texture addresses so as to produce texture addresses corresponding to other pixels which are disposed on the horizontal scanning line between the two pixels; and reading texture data in accordance with the texture addresses of the pixels disposed on the horizontal scanning line between the points of intersection.

10. A texture mapping method actualized in a computer graphics system that visually displays an object in a three-dimensional manner as a collection of polygons, wherein textures representing graphics patterns are put onto interior areas of the polygons which form a surface of the object displayed on a screen of a display device, the texture mapping method comprising the steps of:

projecting a polygon placed in a three-dimensional space onto a screen coordinates system which is two dimensional so as to create a projective image of the polygon on the screen coordinates system;

creating an image of the polygon with regard to a texture coordinates system which is two dimensional;

storing texture data representing an image of texture on the texture coordinates system;

calculating screen addresses of the screen coordinates system and texture addresses of the texture coordinates system with respect to at least a start point and an end point which correspond to points of intersection formed between a horizontal scanning line of the screen and one side of the polygon;

adjusting the screen addresses to produce integer screen addresses representing locations of pixels which are placed in proximity to the points of intersection on the screen coordinates system;

correcting the texture addresses on the basis of differences between the screen addresses and the integer screen addresses, thus producing corrected texture addresses;

adjusting the corrected texture addresses so as to produce integer texture addresses; and reading the texture data in accordance with the integer texture addresses.

11. A computer-readable media storing programs and data that cause a computer graphics system to execute a texture mapping method comprising the steps of:

projecting a polygon placed in a three-dimensional space onto a screen coordinates system which is two dimensional so as to create a projective image of the polygon on the screen coordinates system;

creating an image of the polygon with regard to a texture coordinates system which is two dimensional;

storing texture data representing an image of texture on the texture coordinates system;

calculating screen addresses of the screen coordinates system and texture addresses of the texture coordinates system with respect to at least a start point and an end point which correspond to points of intersection formed between a horizontal scanning line of the screen and one side of the polygon;

adjusting the screen addresses to produce integer screen addresses representing locations of pixels which are placed in proximity to the points of intersection on the screen coordinates system;

correcting the texture addresses on the basis of differences between the screen addresses and the integer screen addresses, thus producing corrected texture addresses;

adjusting the corrected texture addresses so as to produce integer texture addresses; and reading the texture data in accordance with the integer texture addresses.

12. A texture mapping device according to claim 4 wherein the polygon shape is a triangle.

\* \* \* \* \*